Figure 1:
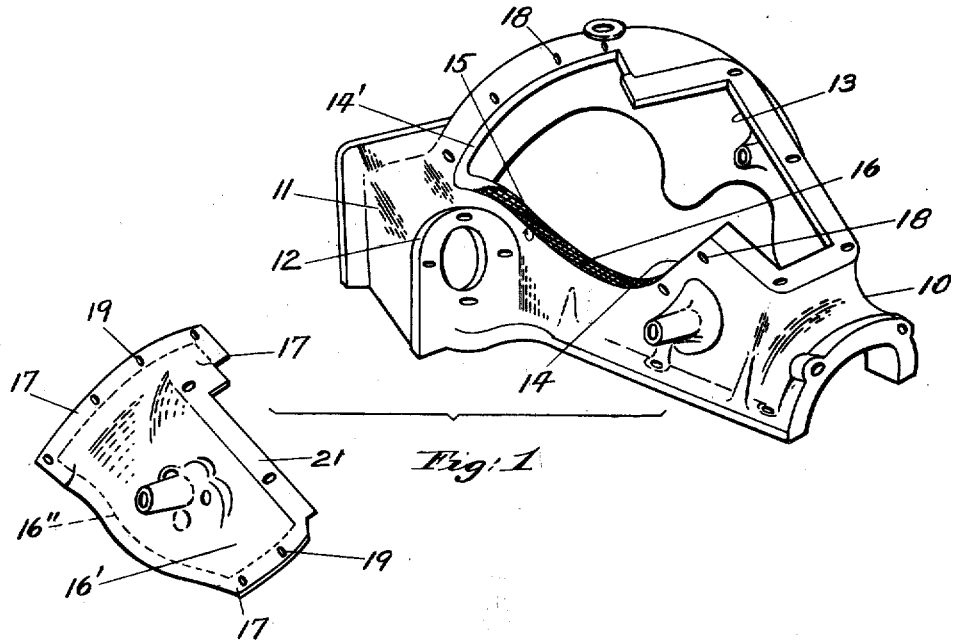

W. F. HUDSON.
TRANSMISSION CASING.
APPLICATION FILED JAN. 30, 1922.

1,425,094.

Patented Aug. 8, 1922.

INVENTOR
William F Hudson

BY William J Jackson
ATTORNEY.

UNITED STATES PATENT OFFICE.

WILLIAM FRANKLIN HUDSON, OF PHILADELPHIA, PENNSYLVANIA.

TRANSMISSION CASING.

1,425,094.  Specification of Letters Patent.  Patented Aug. 8, 1922.

Application filed January 30, 1922. Serial No. 532,634.

*To all whom it may concern:*

Be it known that I, WILLIAM FRANKLIN HUDSON, a citizen of the United States, residing at the city of Philadelphia, county of Philadelphia, and State of Pennsylvania, have invented a certain new and useful Improved Transmission Casing, of which the following is a specification.

This invention has relation to transmission casings for Ford cars and has more especial relation to an improvement upon the construction of parts shown and described in U. S. Letters Patent Number 1,366,677 dated January 25, 1921.

Practice has demonstrated that, commercially considered, the casing parts disclosed in said patent form an impractical disclosure both from a manufacturing standpoint and from a user's stand-point. Foundry practice has disclosed that in removing the casing parts from the molds, the flanged portions of the casing side-opening and the companion flanged portions of its side cover-plate create what is termed "a drag." The effect of this is that the meeting faces of said flanged parts present such a roughened and uneven surface that no two casings or cover-plates therefor are mates. The result is that even if out of many casing-parts, a cover-plate can be fitted to a casing part the two must be first "machined" to provide a dust and oil-tight fit. Here another difficulty arises because no known method exists of "machining" the peculiar formation of curved or irregular meeting faces of the cover-plate and casing. In other words bench-work must be resorted to, the impracticability of which, commercially considered, is apparent. These casings are designed for a cheap, quick, replacement-job for a low priced car and any hand-work or even "machining" that may be required defeats the very purpose of the invention. Another disadvantage arises from the manner of bolting the cover-plate to the casing-body. The bolts are distributed in such relation and in such manner that if the bolts at one end of the cover-plate are screwed home the tendency is present for the other end of the cover-plate to draw away from its seating thus leaving space for the escape of oil and the ingress of dust and dirt. Another disadvantage is that as a snug fit is desired allowance for contraction and expansion is not made which results in the parts failing to mate without machining.

The leading object of the present invention is to overcome the above described disadvantageous features and provide a transmission-case construction which may be readily and cheaply cast or molded and in which the parts are uniform or mated, requiring no machining or similar refining to procure a good fit whereby unskilled labor may quickly effect an installation to provide an efficient, reliable, thoroughly practical and workman-like replacement-job. A further object of the present invention resides in the provision of general details of construction and in the arrangement, combination and connection of parts for attaining the results sought by the leading object. Other and further objects not at this time more particularly set forth will hereinafter appear.

The invention consists of the improvements hereinafter described and finally claimed.

Figure 2:
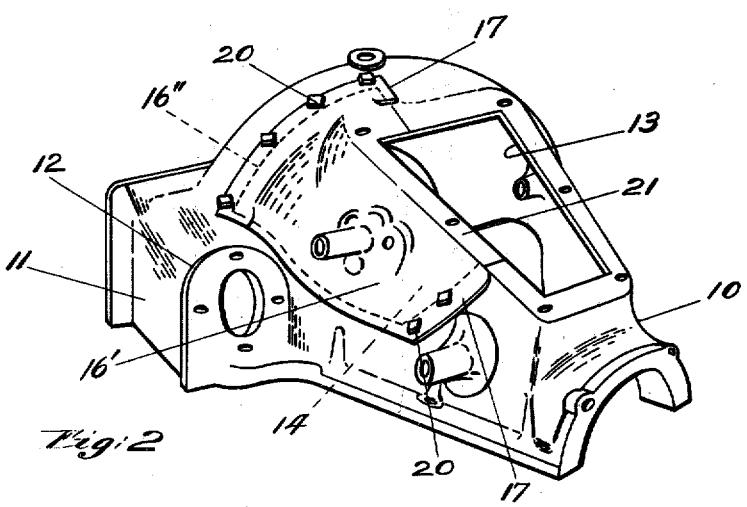

The nature, characteristic features and scope of the invention will be more fully understood from the following description taken in connection with the accompanying drawings forming part hereof, and in which:

Fig. 1, is a perspective view of the transmission casing-part of the invention illustrating the side cover-plate detached therefrom, and Fig. 2, is a similar view illustrating the side cover-plate in position upon the casing-part.

For the purpose of illustrating the invention there is shown in the accompanying drawings one form thereof which is at present preferred, since the same has been found in practice to give satisfactory and reliable results, although it is to be understood that the various instrumentalities of which the invention consists can be variously arranged and organized and that the invention is not limited to the precise arrangement and organization of the instrumentalities as herein shown and described.

In the drawings 10 designates a transmission casing unit calculated to replace a conventional Ford, upper, transmission-casing of the type in which provision is made for self-starting mechanism. Such mechanism is adapted to be encased by housing 11 which is flanged as at 12 to receive a cap not shown.

The casing 10 is provided with the conventional top-opening 13 and upon that side of casing 10 adjacent housing 11 there is provided a side-opening 14 in communication with top-opening 13. Generally stated the side-opening 14 is U-shaped, that part thereof adjacent housing 11 being fashioned upon an irregular, curved line 15 extending from a point above to a point below and beyond the upper portion of flange 12 of housing 11 in order not to intersect flange 12. The rim 14' of said opening 14 is comprised of a plane surface, entirely free of flanged portions so that uniformity of parts is obtained in casting or molding the casings. In practice a strip of thin packing material may be cemented to the rim 14' of opening 14. In the drawings a small section thereof, designated 16, is shown for illustrative purposes.

Adapted for removable attachment to side-opening 14 is a cover-plate 16'. Such plate is shaped to entirely cover said opening and also complete the formation of the conventional opening in the casing top. The cover-plate is provided with a continuous rim 16" adapted to fit within and coact with the rim 14' of the side-opening 14 and is proportioned for an easy fit. In other words contraction and expansion of metal is provided for. Such rim 16" is of the same width as the width of the casing rim 14' and is provided throughout its extent with a lip or extension 17 for overlying the space between the seating rims 14' and 16". It is thus apparent in casting or molding the parts that the side opening need not be an exact size since the lip of the cover-plate overlies the casing side-wall and serves to effectively close any space or opening, when clamped to place against the egress of oil and the ingress of dust and dirt. The body of the casing is tapped as at 18 and bolt-holes 19 are drilled through the lip of the cover-plate in register therewith so that bolts 20 may be employed for clamping the cover-plate to place. It is to be observed that, generally speaking, the longitudinal axis of each bolt is in a plane substantially at right angles to the longitudinal axis of the casing. Thus in tightening the bolts the cover-plate is forced home in a single direction to insure a tight fit of its lip against the casing side-wall. The cover-plate is flanged as at 21 in order to carry out the continuity of the flanged opening in the casing top. To recapitulate. A transmission-casing unit as above described may be readily made according to conventional foundry procedure and shipped direct to the consumer for immediate use without resorting to machining or other refining treatment. The side-opening in which seats the rim of the cover-plate is made of a size to allow for contraction and expansion of metal so that any cover-plate may be readily fitted to any casing. The continuous lip of the cover-plate efficiently closes any space that may be present between the obove described seated parts. Because of the special arrangement of bolts this lip may be caused to snugly abut against the casing body to form a tight joint. All of which tends to provide a commercially practical and efficient device the need for which has long been felt but which need could not be satisfied because of the impractical construction heretofore attempted.

It will now be apparent that there has been devised a novel and useful construction which embodies the features of advantage enumerated as desirable in the statement of the invention and the above description and while there is in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What is claimed is:

1. In a construction of the character stated a transmission-casing unit having a conventional top-opening and a side-opening in communication therewith a part of which side-opening is formed upon an irregular, curved line, a detachable cover-plate for said side-opening which plate is so shaped that a continuous part or rim thereof seats wholly within said opening and an adjacent, continuous part overlies the casing body to close any space between the parts so seated and means for clamping the cover-plate to place.

2. A construction as described in claim 1, in which bolts are employed for affecting said clamping together of parts the longitudinal axis of each bolt extending in a plane substantially at right angles to the longitudinal axis of the casing.

3. In a construction of the character stated a transmission-casing unit having a conventional top-opening and a side-opening in communication therewith the rim of said side-opening having a plane surface at least a part of which is formed upon an irregular, curved line, a detachable cover-plate having a companion-rim for co-actively fitting within the rim of said opening which cover-plate is provided marginally with a lip for overlying the space between the meeting rim faces of the cover-plate and casing-body and means for clamping said cover-plate to place.

4. In a construction of the character stated a transmission-casing unit having a conventional top-opening and a side-opening in communication therewith, a housing for containing self-starting mechanism projected from that part of the casing adjacent said side-opening the latter being formed upon an irregular curved line to avoid intersecting said housing, a detachable cover-plate for the side-opening which plate is so shaped that a continuous part thereof seats within said opening and an adjacent, continuous part overlies the casing-body to close any space between the parts so seated and means for clamping the cover-plate to place.

In testimony whereof, I have hereunto signed my name.

WILLIAM FRANKLIN HUDSON.